US012750687B2

(12) United States Patent
Muccifora et al.

(10) Patent No.: US 12,750,687 B2
(45) Date of Patent: Sep. 29, 2026

(54) PRIORITIZING AFC REQUESTS

(71) Applicant: Cisco Technology, Inc., San Jose, CA (US)

(72) Inventors: Roberto Muccifora, Ropraz (CH); Sachin D. Wakudkar, St-Sulpice (CH); Amine Choukir, Ecublens (CH); Pascal Thubert, Roquefort-les-Pins (FR); Domenico Ficara, Essertines-sur-Yverdon (CH); Jerome Henry, Pittsboro, NC (US); Niloo Bahadori, Greensboro, NC (US); Brian Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 18/429,240

(22) Filed: Jan. 31, 2024

(65) Prior Publication Data

US 2025/0247713 A1 Jul. 31, 2025

(51) Int. Cl.
*H04W 16/18* (2009.01)
*H04W 24/10* (2009.01)

(52) U.S. Cl.
CPC .......... *H04W 16/18* (2013.01); *H04W 24/10* (2013.01)

(58) Field of Classification Search
None
See application file for complete search history.

(56) References Cited

U.S. PATENT DOCUMENTS 12,156,214 B2 * 11/2024 Wu .................... H04W 64/003
2015/0257157 A1 * 9/2015 Lee .................... H04W 48/14
370/329
2022/0329979 A1 * 10/2022 Ansley .................. H04W 4/029
(Continued)

FOREIGN PATENT DOCUMENTS

WO 2023003614 A1 1/2023

OTHER PUBLICATIONS

Luciano K., "Wi-Fi 6E and Automated Frequency Coordination (AFC): What You Need to Know", Extreme Networks, Feb. 1, 2021, Retrieved from https://www.extremenetworks.com/resources/blogs/wi-fi-6e-and-automated-frequency-coordination-afc-what-you-need-to-know on Oct. 30, 2023, pp. 1-3.

*Primary Examiner* — Faiyazkhan Ghafoerkhan
(74) *Attorney, Agent, or Firm* — Rutan & Tucker, LLP; Ravi Mohan; Marc A. McClain

(57) ABSTRACT

Described herein are devices, systems, methods, and processes for optimizing automatic frequency coordination (AFC) queries based on a location-specific likelihood of success. An intermediate service provides a metric or score to determine whether and how to perform a query to the AFC system for a given location. The AFC query metric provided by the intermediate service can be used to determine whether to perform the AFC query, how to prioritize queries, and/or how to adapt the query rate based on the likelihood of success. The system can learn from previous queries and utilize artificial intelligence or machine learning processes in the generation of the AFC query metric. Other relevant data can also be utilized for the generation of the AFC query metric. The number of AFC queries can be reduced based on the utilization of the AFC query metric. Accordingly, costs associated with the AFC queries can be reduced.

17 Claims, 7 Drawing Sheets

(56) References Cited

U.S. PATENT DOCUMENTS

| | | | | |
|---|---|---|---|---|
| 2022/0400392 | A1* | 12/2022 | Ergen | H04W 24/08 |
| 2023/0379128 | A1* | 11/2023 | Wang | H04L 5/0073 |
| 2023/0379840 | A1* | 11/2023 | Wang | H04L 5/0073 |
| 2023/0379911 | A1* | 11/2023 | Wu | H04W 64/003 |
| 2023/0388962 | A1* | 11/2023 | Palayur | H04W 52/283 |
| 2023/0389062 | A1* | 11/2023 | Palayur | H04W 52/18 |
| 2023/0413189 | A1* | 12/2023 | Wang | H04W 72/0453 |
| 2025/0097945 | A1* | 3/2025 | Wu | H04W 64/003 |
| 2025/0240640 | A1* | 7/2025 | Yucek | H04W 16/14 |
| 2025/0247713 | A1* | 7/2025 | Muccifora | H04W 16/18 |

* cited by examiner

PRIORITIZING AFC REQUESTS

The present disclosure relates to wireless communications. More particularly, the present disclosure relates to optimizing automatic frequency coordination (AFC) queries based on likelihood of success.

BACKGROUND

Wireless communication networks, such as Wi-Fi networks, operate in specific frequency bands to transmit and receive data. The frequency bands are shared resources, and their use is regulated to prevent interference between different users. In some frequency bands, unlicensed devices such as Wi-Fi access points (APs) share the spectrum with incumbent users, such as satellite links or fixed microwave links. To prevent interference to these incumbents, a system known as automatic frequency coordination (AFC) is often utilized.

The AFC system manages the use of the frequency bands by determining which frequencies an AP can use at its location without causing interference to incumbents. To do this, the AFC system requires accurate location information for each AP. The AP or a management system supporting the AP sends a query to the AFC system, which then responds with the frequencies that the AP can use. However, these queries can be costly, as AFC operators often charge based on the volume of queries they handle.

In a conventional system, all AFC queries are treated equally, without consideration of their potential success or failure. This can lead to inefficiencies as APs or the management system may repeatedly send queries that are likely to fail. This can also increase the cost of operating the network, as more queries need to be sent to the AFC system. Therefore, a more efficient and cost-effective approach to managing AFC queries in wireless communication networks is needed.

SUMMARY OF THE DISCLOSURE

Systems and methods for optimizing automatic frequency coordination (AFC) queries based on likelihood of success in accordance with embodiments of the disclosure are described herein. In some embodiments, a management logic is configured to receive an indication of a location of an access point (AP), and generate an automatic frequency coordination (AFC) query metric for the location of the AP.

In some embodiments, the management logic is further configured to adjust at least one AFC query associated with the AP based on the generated AFC query metric.

In some embodiments, to adjust the at least one AFC query associated with the AP, the management logic is further configured to determine whether to perform the at least one AFC query associated with the AP based on the generated AFC query metric and perform or refrain to perform the at least one AFC query associated with the AP based on the determination of whether to perform the at least one AFC query.

In some embodiments, to adjust the at least one AFC query associated with the AP, the management logic is further configured to assign a priority level to the at least one AFC query associated with the AP based on the generated AFC query metric.

In some embodiments, to adjust the at least one AFC query associated with the AP, the management logic is further configured to adjust a query rate associated with the at least one AFC query associated with the AP based on the generated AFC query metric.

In some embodiments, the generated AFC query metric includes a positive indication or a negative indication.

In some embodiments, the generated AFC query metric includes an indication of likelihood of success of least one AFC query associated with the AP.

In some embodiments, the AFC query metric is generated based on one or more results of one or more previous AFC queries associated with the location of the AP.

In some embodiments, the AFC query metric is generated based on one or more results of one or more previous AFC queries associated with one or more first locations near the location of the AP.

In some embodiments, the location of the AP is associated with a polygon, the one or more first locations are each associated with a first polygon, and the polygon intersects each first polygon.

In some embodiments, the management logic is further configured to adjust a priority level associated with an AFC query associated with the location of the AP based on a number of APs included in the polygon.

In some embodiments, the AFC query metric is generated based further on a machine learning process.

In some embodiments, the management logic is further configured to send a first AFC query associated with the location of the AP based on the generated AFC query metric, the first AFC query being associated with a first queried area, receive a first AFC response in response to the first AFC query, the first AFC response including a success indication, determine, iteratively, one or more second queried areas based on a Newton's method, each of the one or more second queried areas being larger than the first queried area, each of the one or more second queried areas including one or more other APs, wherein the Newton's method it utilized to minimize a total number of AFC queries, and send one or more AFC queries associated with the location of the AP, each of the one or more AFC queries being associated with one of the one or more second queried areas.

In some embodiments, the AFC query metric is generated based on a report of at least one monitoring radio that detects non-802.11 emission.

In some embodiments, the AFC query metric is generated based on accessing a regulatory database.

In some embodiments, the AFC query metric is generated based on an AFC query-related time series and a present time.

In some embodiments, the AFC query metric is generated based on global navigation satellite system (GNSS) satellite visibility at the AP.

In some embodiments, the AFC query metric is associated with a bandwidth or a channel set.

In some embodiments, a management logic is configured to receive an indication of a location of an access point (AP), generate an automatic frequency coordination (AFC) query metric for the location of the AP, and send an indication of the generated AFC query metric.

In some embodiments, optimizing automatic frequency coordination (AFC) queries includes receiving an indication of a location of an access point (AP), generating an automatic frequency coordination (AFC) query metric for the location of the AP, and adjusting at least one AFC query associated with the AP based on the generated AFC query metric.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
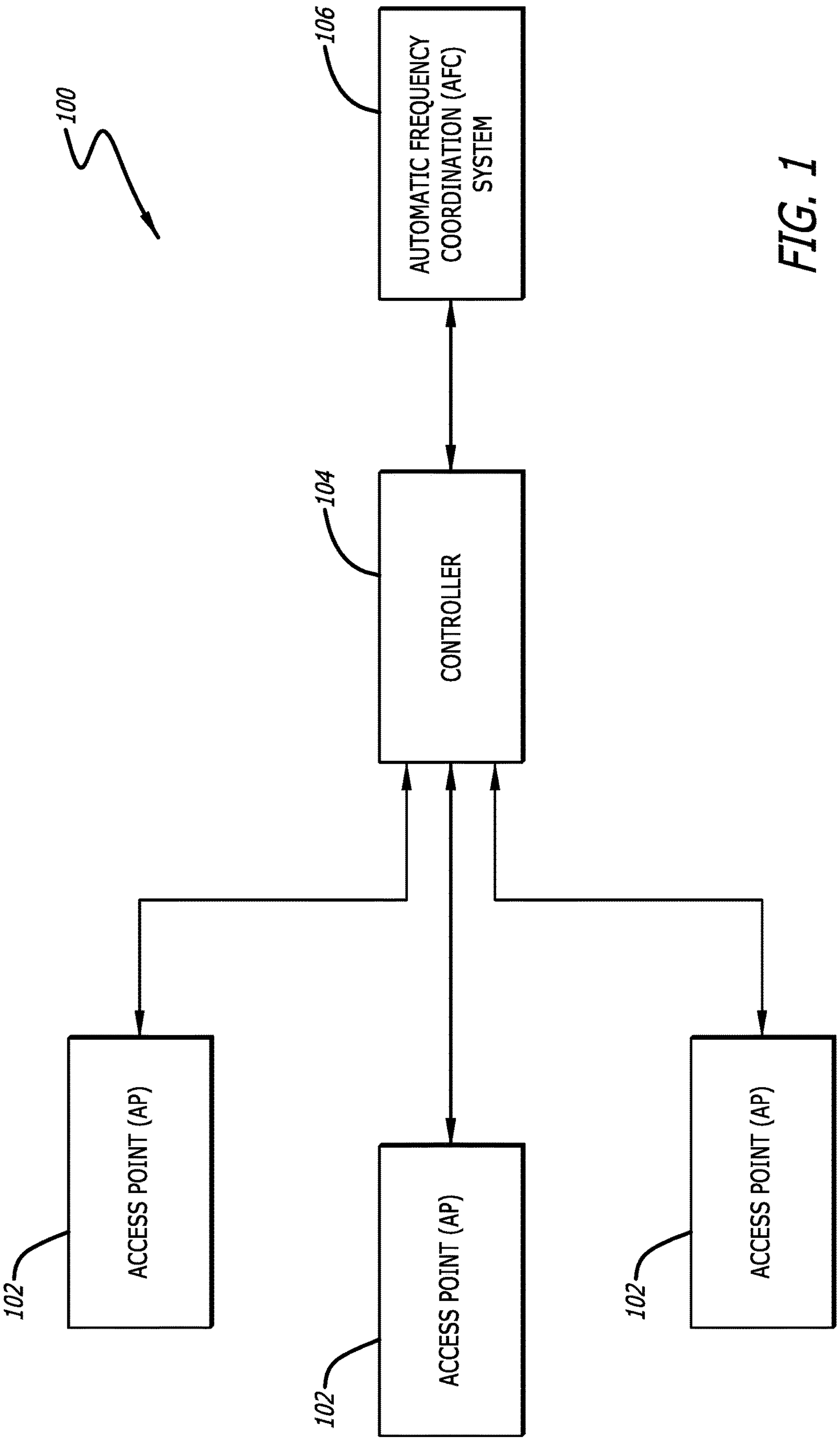
FIG. 1 is a diagram illustrating a wireless communication network in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that optimize automatic frequency coordination (AFC) queries based on a location-specific likelihood of success. In many embodiments, an intermediate service may provide a metric or score (which can be referred to hereinafter as an AFC query metric) to determine whether and how to perform a query to the AFC system for a given location. In a number of embodiments, the AFC query metric for a location may be associated with a requested bandwidth or channel set. In a variety of embodiments, the metric can be a binary indication (e.g., I/O or Yes/No). In some embodiments, the metric may be a more nuanced indication (e.g., a percentage) representing the success likelihood of the AFC query for a location and for a certain amount of bandwidth.

In more embodiments, the intermediate service can be implemented on the access point (AP) itself, on an intermediate system such as, but not limited to, a wireless local area network (LAN) controller (WLC), or on an on-premises or cloud-based management platform. The service may act as a filter before the AFC system, providing a rough but fast and cheap (or cost-free) estimation of the likelihood of a successful AFC query. In additional embodiments, the metric provided by the intermediate service may be utilized to determine whether to perform the AFC query. In further embodiments, the metric provided by the intermediate service can be utilized to determine how to prioritize AFC queries for a number of locations/APs. In still more embodiments, the metric provided by the intermediate service may be utilized to adapt the AFC query rate based on the likelihood of success. By way of a non-limiting example, APs at locations with higher AFC query metric scores may be allowed to request (e.g., send AFC queries) first until enough wireless network signal coverage is obtained. In still further embodiments, the decision of whether and how to make AFC queries may also take into account the need for additional bandwidth.

In still additional embodiments, the intermediate service may learn from results of previous AFC queries and provide the AFC query metric according to a prediction based on consistent previous results. By way of a non-limiting example, a proposed AFC query for a location that consistently returns an incumbent presence on a given set of channels (i.e., unsuccessful previous AFC requests) can be given an AFC query metric indicative of a higher probability of limited channel availability (e.g., a higher probability of an unsuccessful AFC request), and vice versa. In some more embodiments, the intermediate service can build a polygon around the location in question and determine whether the polygon intersects other polygons (i.e., nearby polygons) where the responses to AFC queries are known. If such intersections are found, the intermediate service may derive the likelihood of an unsuccessful AFC request for the location and a given channel set based on the responses to AFC queries for the other polygons.

In certain embodiments, the intermediate service may generate the AFC query metric based on a map of influence. In yet more embodiments, the map of influence can be built statistically from the locations where the management platform has recorded the presence of APs, or built probabilistically from historical query analysis of the queries to and the responses from the AFC (proxy) system. In still yet more embodiments, for an AFC query for the location of an AP, the intermediate service may consider the radius (from the location of the AP) at which other APs are present and the likelihood of the other APs needing to perform AFC queries within a time interval (e.g., within the next n-hour time interval). In many further embodiments, if the AFC query above results in a successful response, the intermediate service can use the Newton's method (i.e., the Newton descent process) to iteratively adjust the geographical precision of the AFC queries. In particular, the intermediate service may reduce the geographical precision and thereby increase the queried area, which can cover one or more of the other APs needing to perform AFC queries soon otherwise. The goal may be to find the optimal geographical precision that minimizes the number of AFC queries while maximizing the area where the AFC response is likely to be positive and where other APs managed by the same platform are present. This is an example of a constrained optimization problem, where the system tries to find the best solution within certain constraints.

In many additional embodiments, the intermediate service may utilize artificial intelligence or machine learning processes for a mesh of polygons. In particular, the intermediate service can predict an AFC query success or failure based on historical experience in the polygon including the location in question as well as the neighboring polygons. In still yet further embodiments, the intermediate service can consider the AP locations to prioritize the AFC queries. By way of a non-limiting example, an AFC query for a location in the polygon having the largest number of APs can be assigned a higher priority level. By way of another non-limiting example, an AFC query for a location in the polygon with the largest intersecting areas with other polygons including APs may be assigned a higher priority level.

In still yet additional embodiments, the intermediate service may learn the potential presence of incumbents based on reports from monitoring radios placed at various locations. The monitoring radios can monitor radio emissions on channels where AFC is specified (e.g., the 6 Ghz band), and may report detected non-802.11 (i.e., non-Wi-Fi) emissions and their operating frequency. Accordingly, based on the reports from the monitoring radios, the intermediate service may infer the likelihood of incumbent presence, and the likely zone of impact of any incumbent. Further, the intermediate service can generate the AFC query metric for a location and a channel set based on the data inferred from the reports from the monitoring radios.

In several embodiments, the intermediate service may generate the AFC query metric for a location and a channel set based on data retrieved from a regulatory database. By way of a non-limiting example, the intermediate service can keep track of fixed services proximity or exclusion zones defined by the federal communications commission (FCC), through the universal licensing system (ULS) access, and then mark all APs being managed by the management platform as available or not available for the standard power mode. Therefore, the intermediate service may generate AFC query metrics for the APs based on whether the APs are marked as available or not available. In several more embodiments, any prediction of AFC query success or failure based on historical data can be made by considering the historical data as a time series. Therefore, the intermediate service may keep track of time-bound availability (e.g., periodical changes in availability) as well, and can generate the AFC query metric for the present time based on the time series.

In numerous embodiments, the intermediate service may determine a level of global satellite navigation system (GNSS) satellite visibility (e.g., the sky view) of an AP (by way of a non-limiting example, by analyzing the received GNSS signal at the AP). The level of GNSS satellite visibility at an AP can be a measure of the uncertainty region associated with the location fix of the AP. In other words, APs with lower GNSS satellite visibility may have higher uncertainty areas. Having a higher uncertain area can correspond to a larger queried area, and therefore a lower likelihood of a successful AFC query. Therefore, the intermediate service may generate or adjust the AFC query metric for an AP based on the GNSS satellite visibility at the AP. In numerous additional embodiments, to determine the uncertainty region associated with the GNSS location fix of an AP, the AP (through its GNSS receiver/sensor) can monitor the GNSS signal over a sufficiently long period of time (e.g., a day) and observe the area over which the GNSS location fix wanders. In further additional embodiments, techniques such as, but not limited to, ranging between APs (e.g., fine timing measurement (FTM)-based ranging) or comparing the air pressure sensor reading against the altitude value from the GNSS location fix can also be utilized to determine the uncertainty region associated with the location fix of the AP.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a “function,” “module,” “apparatus,” or “system.” Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the “C” programming language, scripting programming languages, and/or other similar programming languages.

The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram illustrating a wireless communication network 100 in accordance with various embodiments of the disclosure is shown. In many embodiments, the APs 102 may be devices that allow wireless devices to connect to a network using Wi-Fi or related standards. Each AP 102 can serve multiple users within a defined network area. As part of their operation, the APs 102 may need to perform AFC queries to the AFC system 106 to determine which frequencies they can use without causing interference to incumbent users.

In a number of embodiments, the controller 104 can be a WLC that manages the operation of the APs 102. In a variety of embodiments, the controller 104 can be implemented at an on-premises or cloud-based management platform. In some embodiments, an intermediate service that provides an AFC query metric that can be utilized to determine whether and how to perform an AFC query to the AFC system 106 for a given location can be implemented on the controller 104. The service may act as a filter before the AFC system 106, providing a rough but fast and cheap (or cost-free) estimation of the likelihood of a successful AFC query. In more embodiments, the intermediate service can also be implemented on the APs 102 themselves. In additional embodiments, the AFC system 106 may manage the use of the frequency bands by determining which frequencies an AP 102 can use at its location without causing interference to incumbents. Non-limiting examples of incumbents can include satellite links, fixed microwave links, broadcast services, radar systems, weather sensors, or radio astronomy observatories. The AFC system 106 may need location data for an AP 102 to perform this function. In further embodiments, the WLC (e.g., the controller 104) may send AFC queries on behalf of the APs 102, and may cause the appropriate APs 102 to be enabled or disabled based on the results of the AFC queries. In still more embodiments, at least some of the APs 102 can transmit their own AFC queries (not shown), and can enable or disable themselves based on the results of the AFC queries.

In still further embodiments, the AFC query metric for a location may be associated with a requested bandwidth or channel set. In still additional embodiments, the metric can be a binary indication (e.g., I/O or Yes/No). In some more embodiments, the metric may be a more nuanced indication (e.g., a percentage) representing the success likelihood of the AFC query for a location and for a certain amount of bandwidth.

In certain embodiments, the AFC query metric provided by the intermediate service may be utilized to determine whether to perform the AFC query. In yet more embodiments, the AFC query metric provided by the intermediate service can be utilized to determine how to prioritize AFC queries for a number of locations/APs. In still yet more embodiments, the AFC query metric provided by the intermediate service may be utilized to adapt the AFC query rate based on the likelihood of success. By way of a non-limiting example, APs 120 at locations with higher AFC query metric scores may be allowed to request (e.g., send AFC queries) first until enough wireless network signal coverage is obtained. In many further embodiments, the decision of whether and how to make AFC queries may also take into account the need for additional bandwidth.

In many additional embodiments, the intermediate service may learn from results of previous AFC queries and provide the AFC query metric according to a prediction based on consistent previous results. By way of a non-limiting example, a proposed AFC query for a location that consistently returns an incumbent presence on a given set of channels (i.e., unsuccessful previous AFC requests) can be given an AFC query metric indicative of a higher probability of limited channel availability (e.g., a higher probability of an unsuccessful AFC request), and vice versa.

In still yet further embodiments, the intermediate service may generate the AFC query metric based on a map of influence. In still yet additional embodiments, the map of influence can be built statistically from the locations where the management platform (e.g., the controller 104) has recorded the presence of APs 102, or built probabilistically from historical query analysis of the queries to and the responses from the AFC (proxy) system 106. In several embodiments, for an AFC query for the location of an AP 102, the intermediate service may consider the radius (from the location of the AP 102) at which other APs 102 are present and the likelihood of the other APs 102 needing to perform AFC queries within a time interval (e.g., within the next n-hour time interval). In several more embodiments, if the AFC query above results in a successful response, the intermediate service can use the Newton's method (i.e., the Newton descent process) to iteratively adjust the geographical precision of the AFC queries. In particular, the intermediate service may reduce the geographical precision and thereby increase the queried area, which can cover one or more of the other APs 102 that would need to perform AFC queries soon otherwise. The goal may be to find the optimal geographical precision that minimizes the total number of AFC queries while maximizing the area where the AFC response is likely to be positive and where other APs 102 managed by the same platform are present. This is an example of a constrained optimization problem, where the system tries to find the best solution within certain constraints.

In numerous embodiments, the intermediate service may learn the potential presence of incumbents based on reports from monitoring radios placed at various locations. The monitoring radios can monitor radio emissions on channels where AFC is specified (e.g., the 6 Ghz band), and may report detected non-802.11 (i.e., non-Wi-Fi) emissions and their operating frequency. Accordingly, based on the reports from the monitoring radios, the intermediate service may infer the likelihood of incumbent presence, and the likely zone of impact of any incumbent. Further, the intermediate service can generate the AFC query metric for a location and a channel set based on the data inferred from the reports from the monitoring radios. In numerous additional embodiments, any prediction of AFC query success or failure based on historical data can be made by considering the historical data as a time series. Therefore, the intermediate service may keep track of time-bound availability (e.g., periodical changes in availability) as well, and can generate the AFC query metric for the present time based on the time series.

Although a specific embodiment for a wireless communication network suitable for carrying out the various steps, processes, methods, and operations described herein is discussed with respect to FIG. 1, any of a variety of systems and/or processes may be utilized in accordance with embodiments of the disclosure. For example, the controller can be a cloud-based management platform that manages a large number of APs distributed across multiple locations. The elements depicted in FIG. 1 may also be interchangeable with other elements of FIGS. 2-7 as required to realize a particularly desired embodiment.

Figure 2:
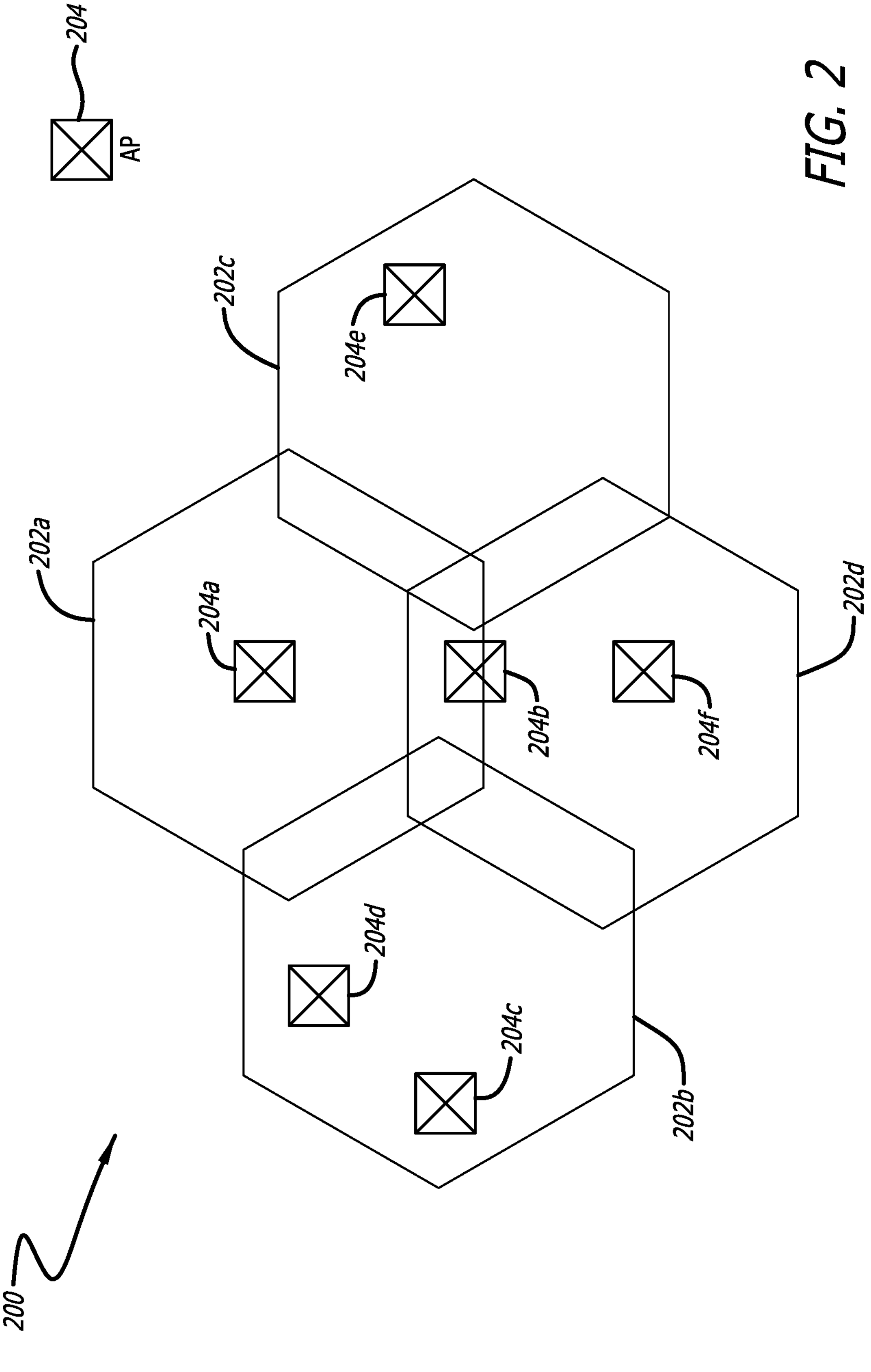
FIG. 2 is a diagram illustrating a geographical representation of access points (APs) in accordance with various embodiments of the disclosure.

Referring to FIG. 2, a diagram 200 illustrating a geographical representation of APs in accordance with various embodiments of the disclosure is shown. In the embodiments shown in FIG. 2, APs **204*a-f* may each be located within one or more polygons 202*a-d*. In many embodiments, the intermediate service can build a polygon around the location in question and determine whether the polygon intersects other polygons (i.e., nearby polygons) where the responses to AFC queries are known. If such intersections are found, the intermediate service may derive the likelihood of an unsuccessful AFC request (or a successful AFC request) for the location and a given channel set based on the responses to AFC queries for the other polygons. Accordingly, if an AFC query is proposed for the AP 204***a*, the intermediate service can determine the polygon 202*a* around the location of the AP 204*a*. Then, the intermediate service can determine that the polygon 202*a* intersects other polygons where the responses to AFC queries are known. In the embodiments shown in FIG. 2, the polygon 202*a* may intersect each of polygons 202*b-d*. In a non-limiting example, if responses to AFC queries are known and consistent for at least two of the three polygons 202*b-d* (e.g., the AFC query result for the polygon 202*b* can be known based on a previous AFC query for the AP 204*c* or the AP 204*d*, the AFC query result for the polygon 202*c* can be known based on a previous AFC query for the AP 204*e*, the AFC query result for the polygon 202*d* can be known based on a previous AFC query for the AP 204*b* or the AP 204*f*), the intermediate service may derive the likelihood of AFC query success or failure for the location of the AP 204*a* based on the known AFC query results for the intersecting polygons 202*b-d*. By way of a non-limiting example, if polygons 202*b* and 202*c* have known, positive AFC query results, the intermediate service can generate an AFC query metric for the location of the AP 204*a* that represents a high likelihood of AFC query success.

In a number of embodiments, the intermediate service may utilize artificial intelligence or machine learning processes for a mesh of polygons. In particular, the intermediate service can predict an AFC query success or failure based on historical experience in the polygon including the location in question as well as the neighboring polygons. Accordingly, by way of a non-limiting example, if an AFC query is proposed for the AP 204*a*, the intermediate service may utilize artificial intelligence or machine learning processes to predict the AFC query success or failure for the AP 204*s* based on historical experience (e.g., AFC query successes and/or failures) in the polygon 202*a* (which includes the location of the AP 204*a*) as well as the neighboring polygons 204*b-d*. Thereafter, an AFC query metric can be generated based on the predicted AFC query success or failure.

In a variety of embodiments, the intermediate service can consider the AP locations to prioritize the AFC queries. By way of a non-limiting example, an AFC query for a location in the polygon having the largest number of APs can be assigned a higher priority level. Accordingly, in the embodiments shown in FIG. 2, if AFC queries are due for all of the APs 204*a-f*, the AFC queries for the APs 202*a-d* and 202*f* can be prioritized over that for the AP 204*e* because each of the APs 202*a-d* and 202*f* is located within one or more polygons 202*a*, 202*b*, and 202*d* having the largest number of APs (e.g., 2 APs) (as opposed to the polygon 202*c* that contains just one AP 204*e*). By way of another non-limiting example, an AFC query for a location in the polygon with the largest intersecting areas with other polygons including APs may be assigned a higher priority level.

Although a specific embodiment for a geographical representation of APs suitable for carrying out the various steps, processes, methods, and operations described herein is discussed with respect to FIG. 2, any of a variety of systems and/or processes may be utilized in accordance with embodiments of the disclosure. For example, the polygons may be dynamically adjusted based on changes in the environment, such as, but not limited to, the addition or removal of APs, changes in incumbent activity, or changes in the physical environment that affect signal propagation. The elements depicted in FIG. 2 may also be interchangeable with other elements of FIGS. 1 and 3-7 as required to realize a particularly desired embodiment.

Figure 3:
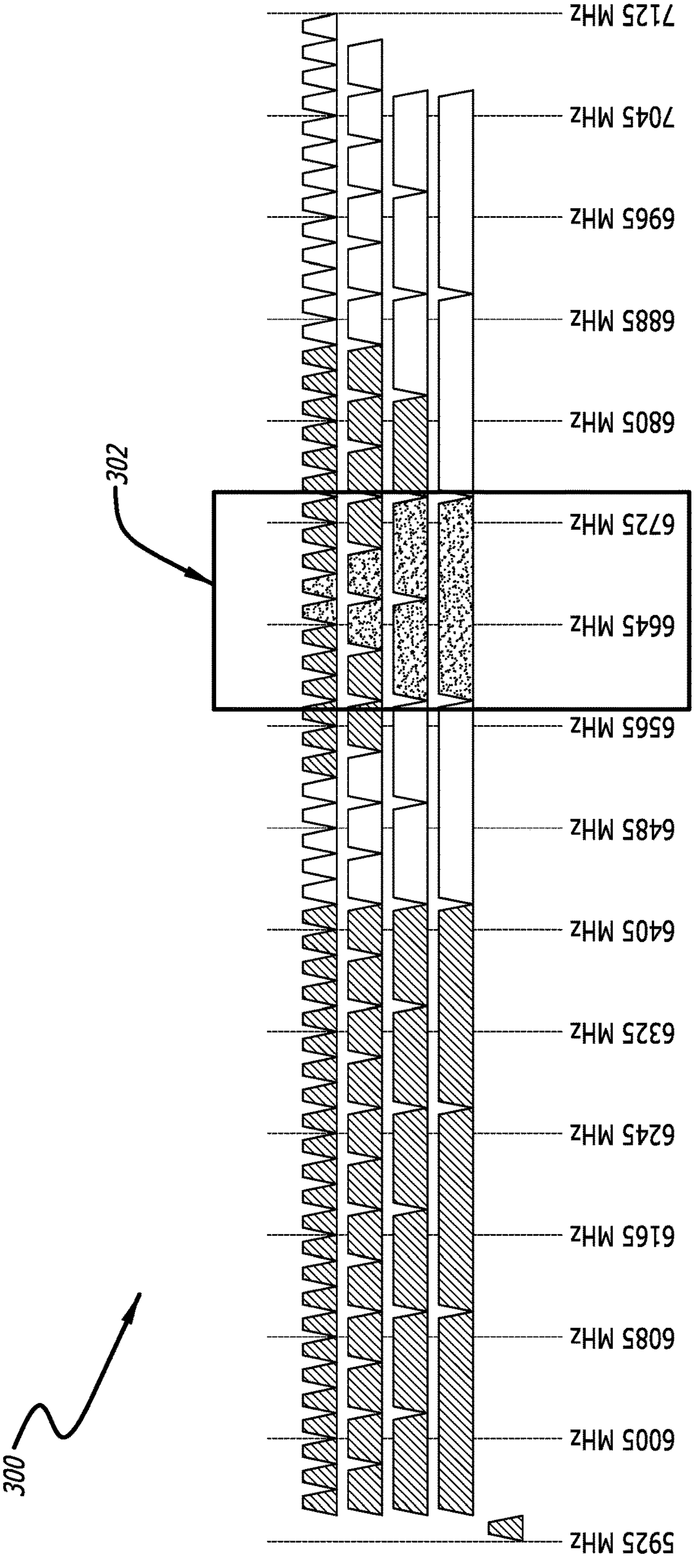
FIG. 3 is a diagram illustrating channel availability for a radio local area network (RLAN) near an incumbent in accordance with various embodiments of the disclosure.

Referring to FIG. 3, a diagram 300 illustrating channel availability for a radio local area network (RLAN) near an incumbent in accordance with various embodiments of the disclosure is shown. The embodiments depicted in FIG. 3 may provide a visual representation of the channel availability for the RLAN in the vicinity of the Allen Telescope Array, where the RLAN can be associated with a location and an uncertainty region. An RLAN near the Allen Telescope Array may need to avoid using channels that are already occupied by the incumbent to prevent interference. The data in the embodiments depicted in FIG. 3 can be retrieved through ULS access. This may be the same data on which the AFC service is based. As shown, several channels 302 around 6,665 MHz are unavailable for the RLAN to utilize. Specifically, there are two 20 MHz channels, two 40 MHz channels, two 80 MHz channels, and one 160 MHz channel that are unavailable. This can indicate that these channels 302 are likely being used by incumbents, such as the Allen Telescope Array or other services, and therefore, the RLAN should avoid these frequencies to prevent causing interference.

Accordingly, in many embodiments, the intermediate service may generate the AFC query metric for a location and a channel set based on data retrieved from a regulatory database. By way of a non-limiting example, the intermediate service can keep track of fixed services proximity or exclusion zones defined by the FCC, through the ULS access, and then mark all APs being managed by the management platform as available or not available for the standard power mode based on the data retrieved from the regulatory database. Therefore, the intermediate service may generate AFC query metrics for the APs based on whether the APs are marked as available or not available.

Although a specific embodiment for a diagram illustrating channel availability for an RLAN suitable for carrying out the various steps, processes, methods, and operations described herein is discussed with respect to FIG. 3, any of a variety of systems and/or processes may be utilized in accordance with embodiments of the disclosure. For example, the channel availability can be dynamically updated based on real-time data from the ULS or other sources. The elements depicted in FIG. 3 may also be interchangeable with other elements of FIGS. 1, 2, and 4-7 as required to realize a particularly desired embodiment.

Figure 4:
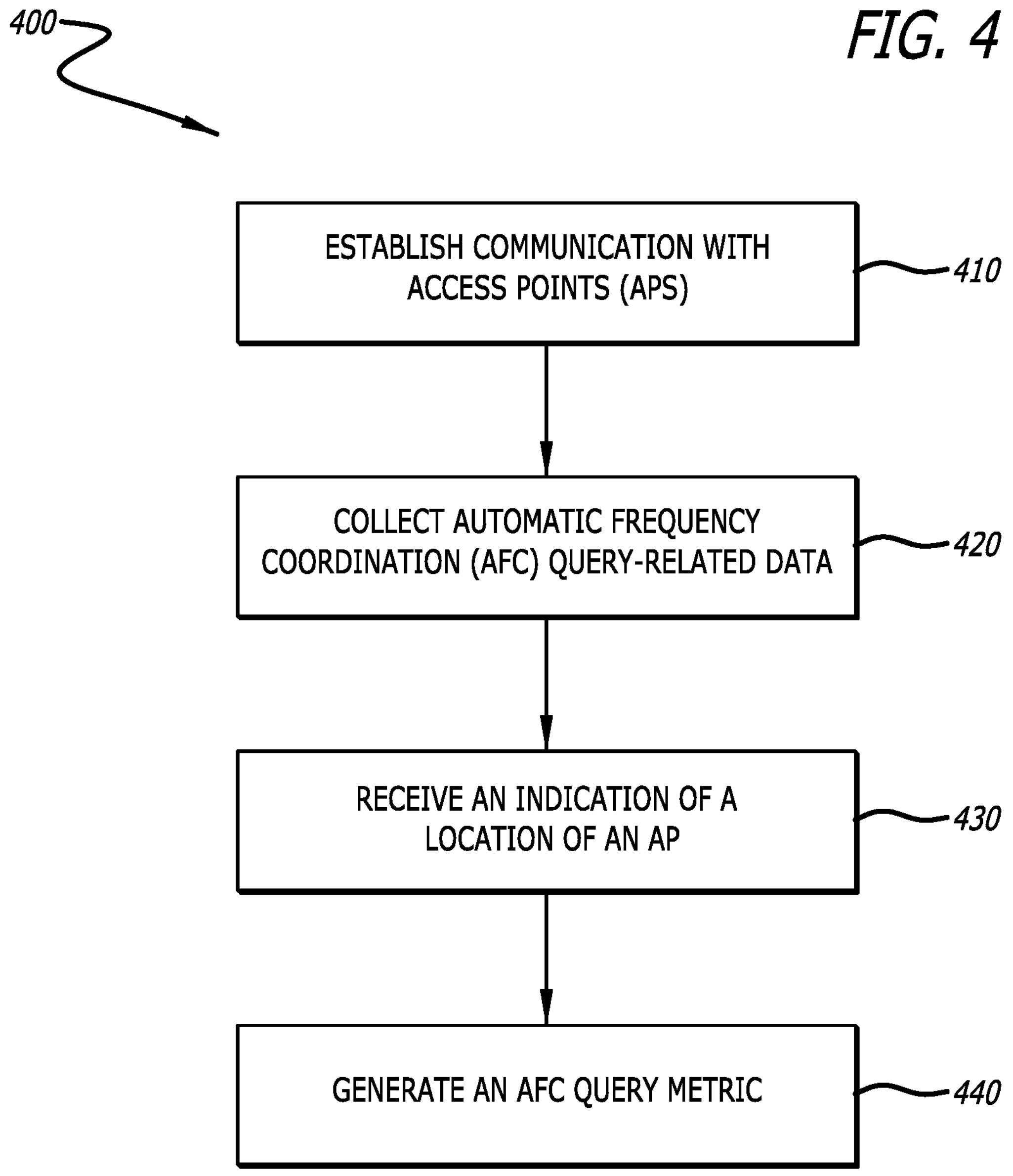
FIG. 4 is a flowchart showing a process for generating an automatic frequency coordination (AFC) query metric in accordance with various embodiments of the disclosure.

Referring to FIG. 4, a flowchart showing a process 400 for generating an AFC query metric in accordance with various embodiments of the disclosure is shown. In many embodiments, the process 400 may establish communication with APs (block 410). In a number of embodiments, this can involve setting up a network connection, authenticating the APs, or exchanging initial configuration data. In a variety of embodiments, the communication may be established over a wired or wireless connection, and can use any suitable communication protocol.

In some embodiments, the process 400 may collect AFC query-related data (block 420). In more embodiments, the AFC query-related data can include, but may not be limited to, previous AFC query results at various, reports from monitoring radios, regulatory data, and/or GNSS satellite visibility at APs. In additional embodiments, the data can be collected from the APs, from a central controller, or from a database.

In further embodiments, the process 400 may receive an indication of a location of an AP (block 430). In still more embodiments, this can involve receiving GNSS coordinates from the AP, determining the location based on network data, or using other suitable location determination techniques. The location data of the AP may be included in an AFC query because the AFC system may need to know the location of the AP in order to determine which, if any, channels are available for use by the AP. In still further embodiments, the location data may also include an uncertainty region.

In still additional embodiments, the process 400 may generate an AFC query metric (block 440). In some more embodiments, the AFC query metric can be generated for the location of the AP, and may be based on the collected AFC query-related data. In certain embodiments, the AFC query metric may provide a measure of the likelihood of a successful AFC query for the location of the AP. In yet more embodiments, the AFC query metric can be associated with a requested channel set. In still yet more embodiments, the AFC query metric may be utilized to determine whether to perform an AFC query, how to prioritize AFC queries, and/or how to adapt the AFC query rate.

Although a specific embodiment for generating an AFC query metric suitable for carrying out the various steps, processes, methods, and operations described herein is discussed with respect to FIG. 4, any of a variety of systems and/or processes may be utilized in accordance with embodiments of the disclosure. For example, the process can be implemented as a machine learning process that learns from previous AFC queries to improve the accuracy of the AFC query metric over time. The elements depicted in FIG. 4 may also be interchangeable with other elements of FIGS. 1-3 and 5-7 as required to realize a particularly desired embodiment.

Figure 5:
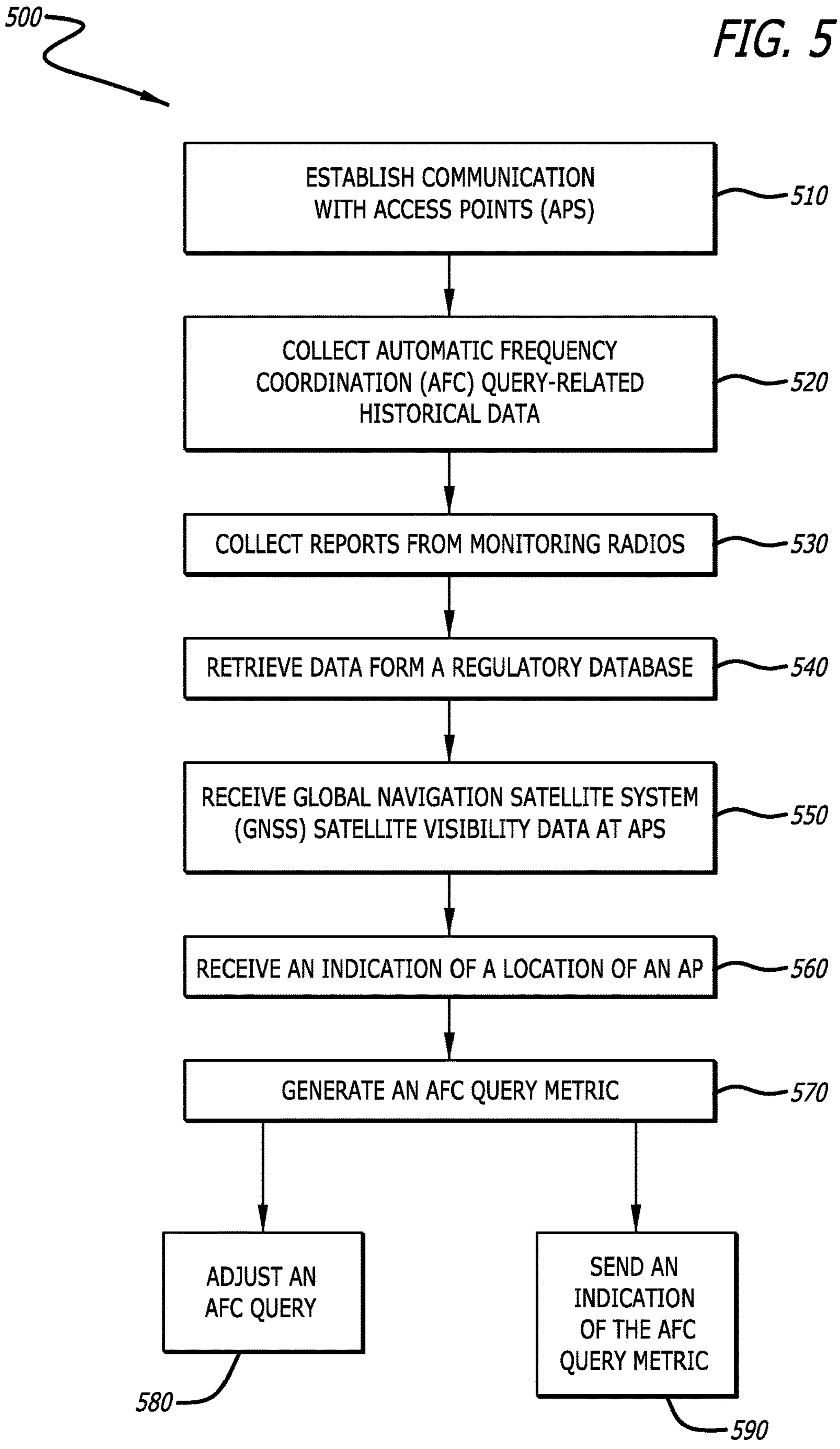
FIG. 5 is a flowchart showing a process for generating and utilizing an AFC query metric in accordance with various embodiments of the disclosure.

Referring to FIG. 5, a flowchart showing a process 500 for generating and utilizing an AFC query metric in accordance with various embodiments of the disclosure is shown. In many embodiments, the process 500 may establish communication with APs (block 510). In a number of embodiments, this can involve setting up a network connection, authenticating the APs, or exchanging initial configuration data. In a variety of embodiments, the communication may be established over a wired or wireless connection, and can use any suitable communication protocol.

In some embodiments, the process 500 may collect AFC query-related historical data (block 520). In more embodiments, the AFC query-related historical data can include previous AFC query results for various locations. In additional embodiments, the AFC query-related historical data may include a time series. The data could be collected from the APs themselves, from a central controller, or from an external database. In further embodiments, the AFC query-related historical data can be collected from the APs, from a central controller, or from a database.

In still more embodiments, the process 500 may collect reports from monitoring radios (block 530). In still further embodiments, the reports can indicate detected non-802.11 (i.e., non-Wi-Fi) emissions in frequency bands where AFC is specified at the locations of the monitoring radios and the operating frequency of the non-802.11 emissions. In still additional embodiments, the likelihood of incumbent presence and/or the likely zone of impact of any incumbent may be inferred from the reports from the monitoring radios. In some more embodiments, the reports can be collected periodically or in response to specific events.

In certain embodiments, the process 500 may retrieve data from a regulatory database (block 540). In yet more embodiments, the regulatory database can include the ULS. In still yet more embodiments, the data may relate to the frequency bands/channels that are available for use by unlicensed devices (e.g., APs) at a location, restrictions on the use of certain frequencies, and/or other regulatory information. In many further embodiments, APs can be marked as being available or not available based on the data from the regulatory database.

In many additional embodiments, the process 500 may receive GNSS satellite visibility data at APs (block 550). In still yet further embodiments, the GNSS satellite visibility data can relate to the number and signal quality of GNSS satellites that are visible from the location of the APs. In still yet additional embodiments, the uncertain region of the GNSS location fix of an AP may be determined based on the GNSS satellite visibility data.

In several embodiments, the process 500 may receive an indication of a location of an AP (block 560). In several more embodiments, this can involve receiving GNSS coordinates from the AP, determining the location based on network data, or using other suitable location determination techniques. The location data of the AP may be included in an AFC query because the AFC system may need to know the location of the AP in order to determine which, if any, channels are available for use by the AP. In numerous embodiments, the location data may also include an uncertainty region.

In numerous additional embodiments, the process 500 may generate an AFC query metric (block 570). In further additional embodiments, the AFC query metric can be generated for the location of the AP, and may be based on one or more of the collected AFC query-related data, the collected reports from the monitoring radios, the data retrieved from the regulatory database, or the GNSS satellite visibility data. In some embodiments, the AFC query metric may provide a measure of the likelihood of a successful AFC query for the location of the AP. In more embodiments, the AFC query metric can be associated with a requested channel set. In additional embodiments, the AFC query metric may be utilized to determine whether to perform an AFC query, how to prioritize AFC queries, and/or how to adapt the AFC query rate.

In further embodiments, the process 500 can adjust an AFC query (block 580). In still more embodiments, the AFC query may be adjusted based on the generated AFC query metric. In still further embodiments, adjusting the AFC query can include determining whether to perform the AFC query, assigning a priority level to the AFC query, and/or adapt an AFC query rate.

In still additional embodiments, the process 500 can send an indication of the AFC query metric (block 590). In some more embodiments, if the AFC query metric is generated at a controller or a management platform but the potential AFC query is to be sent by an AP itself, the controller or the management platform may send an indication of the AFC query metric to the AP. In certain embodiments, the AP can adjust an AFC query based on the received indication of the AFC query metric.

Although a specific embodiment for generating and utilizing an AFC query metric suitable for carrying out the various steps, processes, methods, and operations described herein is discussed with respect to FIG. 5, any of a variety of systems and/or processes may be utilized in accordance with embodiments of the disclosure. For example, the process may be implemented as a machine learning process that learns from previous monitoring radio reports to improve the accuracy of the AFC query metric over time. The elements depicted in FIG. 5 may also be interchangeable with other elements of FIGS. 1-4, 6, and 7 as required to realize a particularly desired embodiment.

Figure 6:
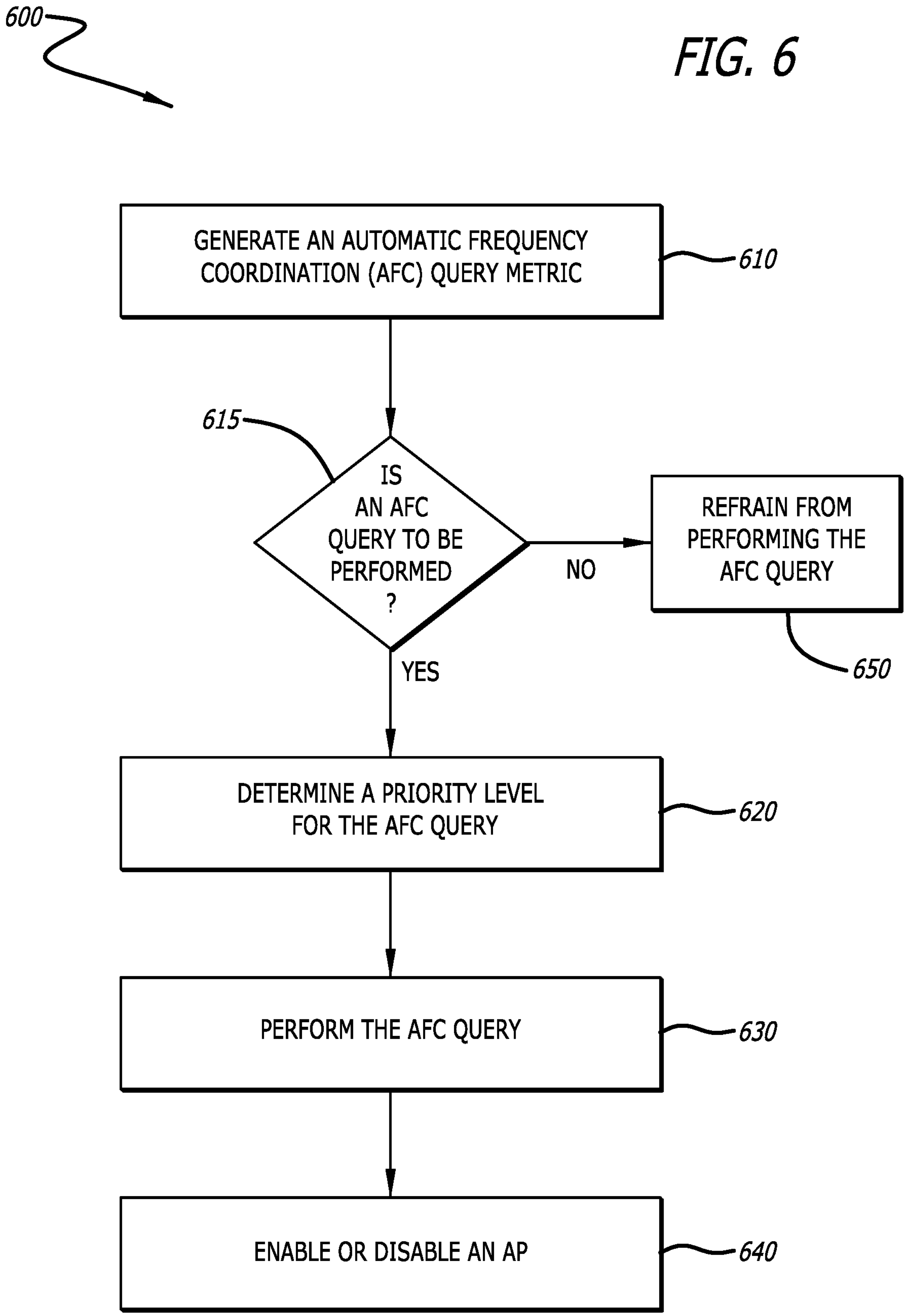
FIG. 6 is a flowchart showing a process for managing an AFC query based on a generated metric in accordance with various embodiments of the disclosure.

Referring to FIG. 6, a flowchart showing a process 600 for managing an AFC query based on a generated metric in accordance with various embodiments of the disclosure is shown. In many embodiments, the process 600 may generate an AFC query metric (block 610). In a number of embodiments, the AFC query metric can be generated for the location of the AP, and may be based on collected AFC query-related data. In a variety of embodiments, the AFC query metric may provide a measure of the likelihood of a successful AFC query for the location of the AP. In some embodiments, the AFC query metric can be associated with a requested channel set. In more embodiments, the AFC query metric may be utilized to determine whether to perform an AFC query, how to prioritize AFC queries, and/or how to adapt the AFC query rate.

In additional embodiments, the process 600 can determine if an AFC query is to be performed (block 615). In further embodiments, the determination may be based on the AFC query metric. In particular, in still more embodiments, if the AFC query metric includes a positive indication (e.g., a "1" or "Yes"), or if the AFC query metric includes a score that is greater than a threshold (indicating a likelihood of AFC query success being greater than a threshold), the process 600 can determine that an AFC query is to be performed. In still further embodiments, in response to the decision to perform an AFC query, the process 600 can determine a priority level for the AFC query. On the other hand, in still additional embodiments, if the AFC query metric includes a negative indication (e.g., a "0" or "No"), or if the AFC query metric includes a score that is less than a threshold (indicating a likelihood of AFC query success being less than a threshold), the process 600 can determine that an AFC query is not to be performed. In some more embodiments, when the decision is made not to perform an AFC query, the process 600 can refrain from performing the AFC query.

In certain embodiments, in response to the decision to perform an AFC query, the process 600 can determine a priority level for the AFC query (block 620). In yet more embodiments, the priority level may be based on the AFC query metric. By way of a non-limiting example, a proposed AFC query having a higher AFC query metric score can be assigned a higher priority level. In still yet more embodiments, an AFC query for a location in the polygon having the largest number of APs can be assigned a higher priority level. A higher priority level can result in the AFC query being performed sooner.

In many further embodiments, the process 600 can perform the AFC query (block 630). In many additional embodiments, this may involve sending a query to an AFC system. In still yet further embodiments, the AFC query can include one or more of a location, an uncertain region, a requested channel list, and/or a power mode/level. In still yet additional embodiments, the AFC query process may further include receiving a response from the AFC system and processing the response to determine which frequencies, if any, the AP can use.

In several embodiments, the process 600 can enable or disable an AP (block 640). In several more embodiments, if the AFC query is successful and the AP can use a frequency without causing interference, the AP may be enabled based on the AFC response. In numerous embodiments, if the AFC query is not successful, which may indicate that the AP cannot operate without causing interference to incumbents, the AP may be disabled.

In numerous additional embodiments, when the decision is made not to perform an AFC query, the process 600 can refrain from performing the AFC query (block 650). In further additional embodiments, this may involve skipping the AFC query and continuing with other operations, such as generating an AFC query metric for another AP and determining whether the AFC query should be performed for the other AP. In some embodiments, the AFC query metric can be regenerated for the AP after a waiting period to determine whether an AFC query should be performed for the AP.

Although a specific embodiment for managing an AFC query based on a generated metric suitable for carrying out the various steps, processes, methods, and operations described herein is discussed with respect to FIG. 6, any of a variety of systems and/or processes may be utilized in accordance with embodiments of the disclosure. For example, the process can be implemented as part of a dynamic frequency management system that continuously adjusts the operation of the APs based on the changing radio environment. The elements depicted in FIG. 6 may also be interchangeable with other elements of FIGS. 1-5 and 7 as required to realize a particularly desired embodiment.

Figure 7:
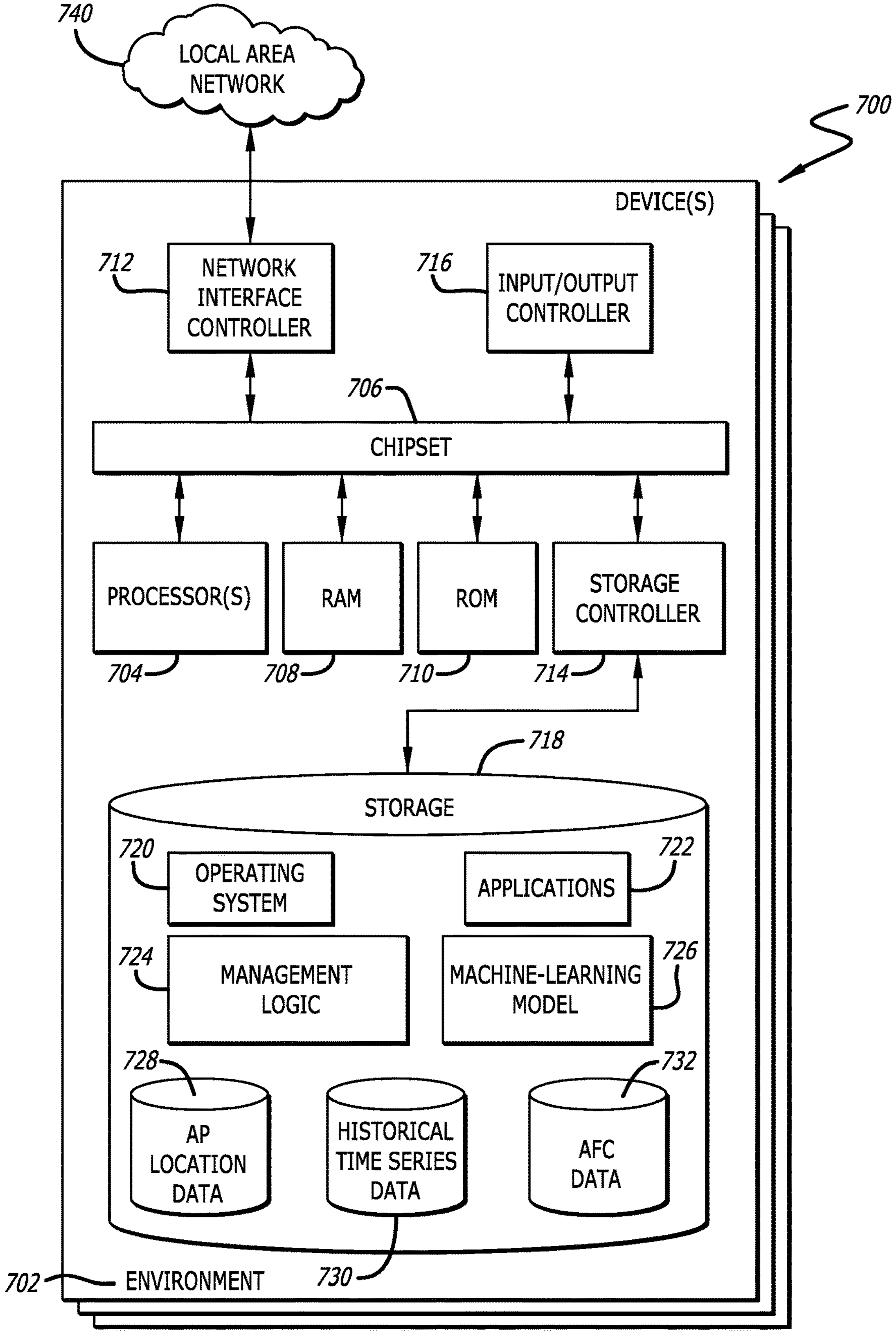
FIG. 7 is a conceptual block diagram for one or more devices capable of executing components and logic for implementing the functionality and embodiments described above.

Referring to FIG. 7, a conceptual block diagram for one or more devices 700 capable of executing components and logic for implementing the functionality and embodiments described above is shown. The embodiment of the conceptual block diagram depicted in FIG. 7 can illustrate a conventional server computer, workstation, desktop computer, laptop, tablet, network appliance, e-reader, smartphone, or other computing device, and can be utilized to execute any of the application and/or logic components presented herein. The device 700 may, in some examples, correspond to physical devices or to virtual resources described herein.

In many embodiments, the device 700 may include an environment 702 such as a baseboard or "motherboard," in physical embodiments that can be configured as a printed circuit board with a multitude of components or devices connected by way of a system bus or other electrical communication paths. Conceptually, in virtualized embodiments, the environment 702 may be a virtual environment that encompasses and executes the remaining components and resources of the device 700. In more embodiments, one or more processors 704, such as, but not limited to, central processing units ("CPUs") can be configured to operate in conjunction with a chipset 706. The processor(s) 704 can be standard programmable CPUs that perform arithmetic and logical operations necessary for the operation of the device 700.

In additional embodiments, the processor(s) 704 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 706 may provide an interface between the processor(s) 704 and the remainder of the components and devices within the environment 702. The chipset 706 can provide an interface to a random-access memory ("RAM") 708, which can be used as the main memory in the device 700 in some embodiments. The chipset 706 can further be configured to provide an interface to a computer-readable storage medium such as a read-only memory ("ROM") 710 or non-volatile RAM ("NVRAM") for storing basic routines that can help with various tasks such as, but not limited to, starting up the device 700 and/or transferring information between the various components and devices. The ROM 710 or NVRAM can also store other application components necessary for the operation of the device 700 in accordance with various embodiments described herein.

Different embodiments of the device 700 can be configured to operate in a networked environment using logical connections to remote computing devices and computer systems through a network, such as the network 740. The chipset 706 can include functionality for providing network connectivity through a network interface card ("NIC") 712, which may comprise a gigabit Ethernet adapter or similar component. The NIC 712 can be capable of connecting the device 700 to other devices over the network 740. It is contemplated that multiple NICs 712 may be present in the device 700, connecting the device to other types of networks and remote systems.

In further embodiments, the device 700 can be connected to a storage 718 that provides non-volatile storage for data accessible by the device 700. The storage 718 can, for example, store an operating system 720, applications 722, AP location data 728, historical time series data 730, and AFC data 732, which are described in greater detail below. The storage 718 can be connected to the environment 702 through a storage controller 714 connected to the chipset 706. In certain embodiments, the storage 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 700 can store data within the storage 718 by transforming the physical state of the physical storage units to reflect the information being stored. The specific transformation of physical state can depend on various factors. Examples of such factors can include, but are not limited to, the technology used to implement the physical storage units, whether the storage 718 is characterized as primary or secondary storage, and the like.

For example, the device 700 can store information within the storage 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 700 can further read or access information from the storage 718 by detecting the physical states or characteristics of one or more particular locations within the physical storage units.

In addition to the storage 718 described above, the device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 700. In some examples, the operations performed by a cloud computing network, and or any components included therein, may be supported by one or more devices similar to device 700. Stated otherwise, some or all of the operations performed by the cloud computing network, and or any components included therein, may be performed by one or more devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 718 can store an operating system 720 utilized to control the operation of the device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 718 can store other system or application programs and data utilized by the device 700.

In various embodiment, the storage 718 or other computer-readable storage media is encoded with computer-executable instructions which, when loaded into the device 700, may transform it from a general-purpose computing system into a special-purpose computer capable of implementing the embodiments described herein. These computer-executable instructions may be stored as application 722 and transform the device 700 by specifying how the processor(s) 704 can transition between states, as described above. In some embodiments, the device 700 has access to computer-readable storage media storing computer-executable instructions which, when executed by the device 700, perform the various processes described above with regard to FIGS. 1-6. In more embodiments, the device 700 can also include computer-readable storage media having instructions stored thereupon for performing any of the other computer-implemented operations described herein.

In still further embodiments, the device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can be configured to provide output to a display, such as a computer monitor, a flat panel display, a digital projector, a printer, or other type of output device. Those skilled in the art will recognize that the device 700 might not include all of the components shown in FIG. 7, and can include other components that are not explicitly shown in FIG. 7, or might utilize an architecture completely different than that shown in FIG. 7.

As described above, the device 700 may support a virtualization layer, such as one or more virtual resources executing on the device 700. In some examples, the virtualization layer may be supported by a hypervisor that provides one or more virtual machines running on the device 700 to perform functions described herein. The virtualization layer may generally support a virtual resource that performs at least a portion of the techniques described herein.

In many embodiments, the device 700 can include a management logic 724. The management logic 724 may oversee the operation of various elements within the system. The management logic 724 can coordinate tasks such as, but not limited to, data collection, AFC query generation, AFC query metric generation, and decision-making processes.

In a number of embodiments, the storage 718 can include AP location data 728. The AP location data 728 may relate to the geographical location associated with each AP in the network. The AP location data 728 can include coordinates from a GNSS or other location determination techniques, and may be associated with an uncertain region. The AP location data 728 for an AP may be included in an AFC query for the AP.

In various embodiments, the storage 718 can include historical time series data 730. The historical time series data 730 may represents a collection of data points gathered over time, providing a chronological sequence of values. The historical time series data 730 can include the historical AFC query results for various locations, the reports from monitoring radios, the data retrieved from the regulatory database, and/or the GNSS visibility data at APs.

In still more embodiments, the storage 718 can include AFC data 732. The AFC data 732 may relate to AFC queries, including, but not limited to, their results, parameters, and associated metrics. The AFC data 732 can be utilized to manage the use of frequency bands by the APs, ensuring they operate without causing interference to incumbent users.

Finally, in many embodiments, data may be processed into a format usable by a machine-learning model 726 (e.g., feature vectors), and or other pre-processing techniques. The machine-learning ("ML") model 726 may be any type of ML model, such as supervised models, reinforcement models, and/or unsupervised models. The ML model 726 may include one or more of linear regression models, logistic regression models, decision trees, Naïve Bayes models, neural networks, k-means cluster models, random forest models, and/or other types of ML models 726. The ML model 726 may be configured to analyze the collected data to predict the likelihood of a successful AFC query and optimize the operation of the APs in the network.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network device, comprising:

a processor;

at least one network interface controller configured to provide access to a network; and a memory communicatively coupled to the processor, wherein the memory comprises a management logic that is configured to:

receive an indication of a location of an access point (AP);

generate an automatic frequency coordination (AFC) query metric for the location of the AP;

wherein the AFC query metric is generated based on one or more results of one or more previous AFC queries associated with one or more first locations near the location of the AP;

wherein the location of the AP is associated with a polygon, the one or more first locations are each associated with a first polygon; and wherein the management logic is further configured to adjust a priority level associated with an AFC query associated with the location of the AP based on a number of APs included in the polygon.

2. The network device of claim 1, wherein the management logic is further configured to adjust at least one AFC query associated with the AP based on the generated AFC query metric.

3. The network device of claim 2, wherein to adjust the at least one AFC query associated with the AP, the management logic is further configured to:

determine whether to perform the at least one AFC query associated with the AP based on the generated AFC query metric; and perform or refrain to perform the at least one AFC query associated with the AP based on the determination of whether to perform the at least one AFC query.

4. The network device of claim 2, wherein to adjust the at least one AFC query associated with the AP, the management logic is further configured to assign a priority level to the at least one AFC query associated with the AP based on the generated AFC query metric.

5. The network device of claim 2, wherein to adjust the at least one AFC query associated with the AP, the management logic is further configured to adjust a query rate associated with the at least one AFC query associated with the AP based on the generated AFC query metric.

6. The network device of claim 1, wherein the generated AFC query metric includes a negative indication so an AFC query is not performed.

7. The network device of claim 1, wherein the generated AFC query metric includes an indication of likelihood of success of least one AFC query associated with the AP.

8. The network device of claim 1, wherein the AFC query metric is generated based on one or more results of one or more previous AFC queries associated with the location of the AP.

9. The network device of claim 1, wherein the AFC query metric is generated based further on a machine learning process.

10. The network device of claim 1, wherein the management logic is further configured to:

send a first AFC query associated with the location of the AP based on the generated AFC query metric, the first AFC query being associated with a first queried area;

receive a first AFC response in response to the first AFC query, the first AFC response including a success indication;

determine, iteratively, one or more second queried areas based on a Newton's method, each of the one or more second queried areas being larger than the first queried area, each of the one or more second queried areas including one or more other APs;

wherein the Newton's method is utilized to minimize a total number of AFC queries; and send one or more AFC queries associated with the location of the AP, each of the one or more AFC queries being associated with one of the one or more second queried areas.

11. The network device of claim 1, wherein the AFC query metric is generated based on a report of at least one monitoring radio that detects non-802.11 emission.

12. The network device of claim 1, wherein the AFC query metric is generated based on accessing a regulatory database.

13. The network device of claim 1, wherein the AFC query metric is generated based on an AFC query-related time series and a present time.

14. The network device of claim 1, wherein the AFC query metric is generated based on global navigation satellite system (GNSS) satellite visibility at the AP.

15. The network device of claim 1, wherein the AFC query metric is associated with a bandwidth or a channel set.

16. A network device, comprising:

a processor;

at least one network interface controller configured to provide access to a network; and a memory communicatively coupled to the processor, wherein the memory comprises a management logic that is configured to:

receive an indication of a location of an access point (AP);

generate an automatic frequency coordination (AFC) query metric for the location of the AP;

send an indication of the generated AFC query metric;

wherein the AFC query metric is generated based on one or more results of one or more previous AFC queries associated with one or more first locations near the location of the AP;

wherein the location of the AP is associated with a polygon, the one or more first locations are each associated with a first polygon; and wherein the management logic is further configured to adjust a priority level associated with an AFC query associated with the location of the AP based on a number of APs included in the polygon.

17. A method for optimizing automatic frequency coordination (AFC) queries, comprising:

receiving an indication of a location of an access point (AP);

generating an automatic frequency coordination (AFC) query metric for the location of the AP;

adjusting at least one AFC query associated with the AP based on the generated AFC query metric;

generating the AFC query metric based on one or more results of one or more previous AFC queries associated with one or more first locations near the location of the AP;

associating the location of the AP with a polygon, the one or more first locations are each associated with a first polygon; and adjusting a priority level associated with an AFC query associated with the location of the AP based on a number of APs included in the polygon.

* * * * *